United States Patent [19]

Thomas

[11] 4,001,198
[45] Jan. 4, 1977

[54] METHOD OF RECOVERING NUTRIENTS FROM CHEESE WHEY AND PURIFYING THE EFFLUENT

[76] Inventor: Frank A. Thomas, 309 Reese St., Greenwood, Wis. 54437

[22] Filed: Dec. 11, 1975

[21] Appl. No.: 639,843

Related U.S. Application Data

[63] Continuation-in-part of Ser. No. 483,912, May 28, 1974, abandoned.

[52] U.S. Cl. .......................... 260/112 R; 210/63 R; 426/491
[51] Int. Cl.² ..................... A23J 3/00; A23C 21/00
[58] Field of Search ................ 260/112 R; 426/491; 210/63

[56] References Cited

UNITED STATES PATENTS

| | | | |
|---|---|---|---|
| 3,791,283 | 2/1974 | Moreno et al. | 260/112 R |
| 3,920,548 | 11/1975 | Fassell et al. | 210/63 R |
| 3,930,039 | 12/1975 | Kuipers | 426/491 |

OTHER PUBLICATIONS

Cole et al., Water Pollution Control Federation Journal, 46, 2579–2592, (1974).
McDonough et al., J. Dairy Science, 54, (No. 10), 1406–1409, (1971).

*Primary Examiner*—Lewis T. Jacobs
*Assistant Examiner*—H. H. Fletcher
*Attorney, Agent, or Firm*—John C. Cooper, III

[57] ABSTRACT

Dry food quality protein and lactose powders are produced from cheese whey by sequential ultrafiltration processes, each of which removes as permeate substantial amounts of water and dissolved solids from the respective concentrates. In the initial protein recovery process, the concentrated protein fraction is pasteurized to inhibit bacterial growth and is evaporated to produce a protein substance which is palatable, highly soluble in water and rich in essential amino acids. The lactose concentration step produces a fine quality sweetner of excellent solubility and food value. Temperatures and pressures are carefully controlled in the first two processing operations. A third operation removes additional solid material which can be easily disposed of and a fourth operation reduces the BOD of the remaining liquid fraction to the point that it can be discharged into rivers or streams. The overall process is highly energy efficient when compared to other processes of treating whey to recover nutrients and reduce pollution.

21 Claims, 7 Drawing Figures

METHOD OF RECOVERING NUTRIENTS FROM CHEESE WHEY AND PURIFYING THE EFFLUENT

This is a continuation-in-part of U.S. Application Ser. No. 483,912 filed May 28, 1974, now abandoned.

BACKGROUND OF THE INVENTION

This invention relates generally to the art of ultrafiltration, and in particular to a process of using ultrafiltration to separate valuable nutrients from cheese whey. It has been estimated that well in excess of twenty billion pounds of whey are produced in the United States each year as a by-product of the cheese industry. In manufacturing cheese, the curd is separated from the whey and the former is cured to produce cheese. The curd itself contains up to about ninety percent of the original milk protein, while the balance of such protein remains in the whey. The whey also contains substantial quantities of lactose, a comercially valuable sweetner used extensively by the baking industry.

Cheese factories are confronted with the problem of disposing of the whey, as no commercially practical methods have been developed for separating whey's valuable constituents, i.e., proteins and lactose, even though it has been known for years that an important source of protein and lactose is being wasted. A great amount of research time and money has been spent attempting to solve the problem. For example, see McDonough and Mattingly, "Pilot Plant Concentration of Cheese Whey by Reverse Osmosis," *Food Technology*, 24: 194,1970.

Some benefit has been derived from whey by merely concentrating the protein and lactose to provide an impure powder for animal and human consumption, but this procedure can be profitable only in times of rising meat prices. For the most part, then, the whey is dumped onto fields, in ditches, or into rivers and streams. However, due to the high BOD and COD of cheese whey, serious pollution problems result from dumping whey, and the USDA, FDA and Federal and State environmental agencies have launched an attack on the cheese industries for its whey disposal practices. Some cheese plants have been forced to close or pay large fines because of the whey pollution problems.

At the same time that literally millions of pounds of protein and lactose are being discarded with cheese whey, scientific researchers and nutritionists are searching for suitable milk replacers for infant formulas, high protein diet supplements and animal food enhancers. It is known that the proteins contained in cheese whey are highly desirable. Such proteins are literally "power-packed" in that they are rich in essential amino acids which cannot be found elsewhere in natural food products. In addition, the proteins are soluble in water and the resultant "milk" is quite palatable. The lactose material in whey is highly soluble, has fine browning characteristics in baked goods, and has considerable food and energy values. It is clear then that an economically feasible process for separating nutrients from cheese whey would benefit several major food processing industries in this country and throughout the world.

Some discussion of prior attempts at separating cheese whey proteins from other ingredients will be helpful. The earliest methods used chemical separation techniqes such as pH adjustment, heat treatments, flocculation, etc. to produce low yields of highly denatured proteins. The products from such processes do not possess the desired solubility and taste qualities required for milk replacers. Electrodialysis has also been employed to separate salts from cheese whey proteins, but this process is slow and expensive, mainly due to high power requirements.

The most recent efforts to separate protein from cheese whey have employed the principles of ultrafiltration or reverse osmosis. The osmosis process utilizes a semipermeable membrane flanked on either side by a concentrated solute solution and a less concentrated solution. Natural osmotic forces will tend to equalize the solute concentration by passing water through the membrane, while the solute cannot pass through the membrane. By applying a pressure to the concentrated solution, pure water can be forced back through the membrane, oppositely to the normal osmotic flow, thereby concentrating the solute. In ultrafiltration, on the other hand, pressure is applied to a solution to force the solvent through a semipermeable membrane.

Recent attempts at employing these processes for cheese whey separation have used a membrane which is selected so that protein will not pass through the membrane, but through which lactose and other constituents of whey will pass. Membranes have been designed in various shapes, including flat plates and hollow tubes. Tubular membranes are not particularly desirable because of the high rate of membrane clogging from whey solids leading to frequent repair or replacement of the costly membranes.

SUMMARY OF THE INVENTION

A primary object of the present invention is to provide a process for separating nutrients from cheese whey.

Another object of the present invention is to provide methods for separating high purity protein and lactose products from cheese whey in an economically feasible manner.

A further object of the present invention is to provide a filtration method for separating proteins and lactose from cheese whey in which filtration membrane clogging is minimized.

Yet another object of the present invention is to provide a power efficient process for separating nutrients from cheese whey.

A still further object of the present invention is to provide a method for reducing the BOD and COD of the effluents from cheese whey nutrient recovery operations.

Yet another object of the present invention is to provide a method for separating solids from cheese whey in which the solid content of concentrate fractions in membrane separation may be carefully controlled.

Another object of the present invention is to provide a method for separating proteins from cheese whey in which protein denaturization and bacterial growth are minimized.

These and other objects of the present invention will be described in the following specification and in conjunction with the drawings, but generally the process can be described as follows. Whey is cooled to below 90° F and is pumped through an ultrafiltration system including spirally-wound ultrafiltration modules. Micrometer valves are provided so that the solids content of the protein concentrate may be carefully brought to the desired level at which time product is bled from the system. The temperature of the product is then raised for a time sufficient to kill bacteria, but for a time insufficient to substantially denature the product. The protein concentrate is cooled and then later evaporated and spray dried. The particulars of the process variables for the system will be described herein.

Step two of the process involves a second ultrafiltration of the permeate from step one, but using membranes which are lactose selective. The concentrate from this process step is washed with water and refractionated. This product is also evaporated and spray dried, but temperature control is required here to insure proper crystallization of the lactose product.

The major portion of remaining whey solids from step two are removed by a third ultrafiltration operation using membranes selective to even small molecular weights. Finally, oxygen is added to the final effluent or permeate to reduce the BOD and COD to the extent that such effluent or permeate can be dumped safely without significant pollution.

DESCRIPTION OF A PREFERRED EMBODIMENT

Figure 1:
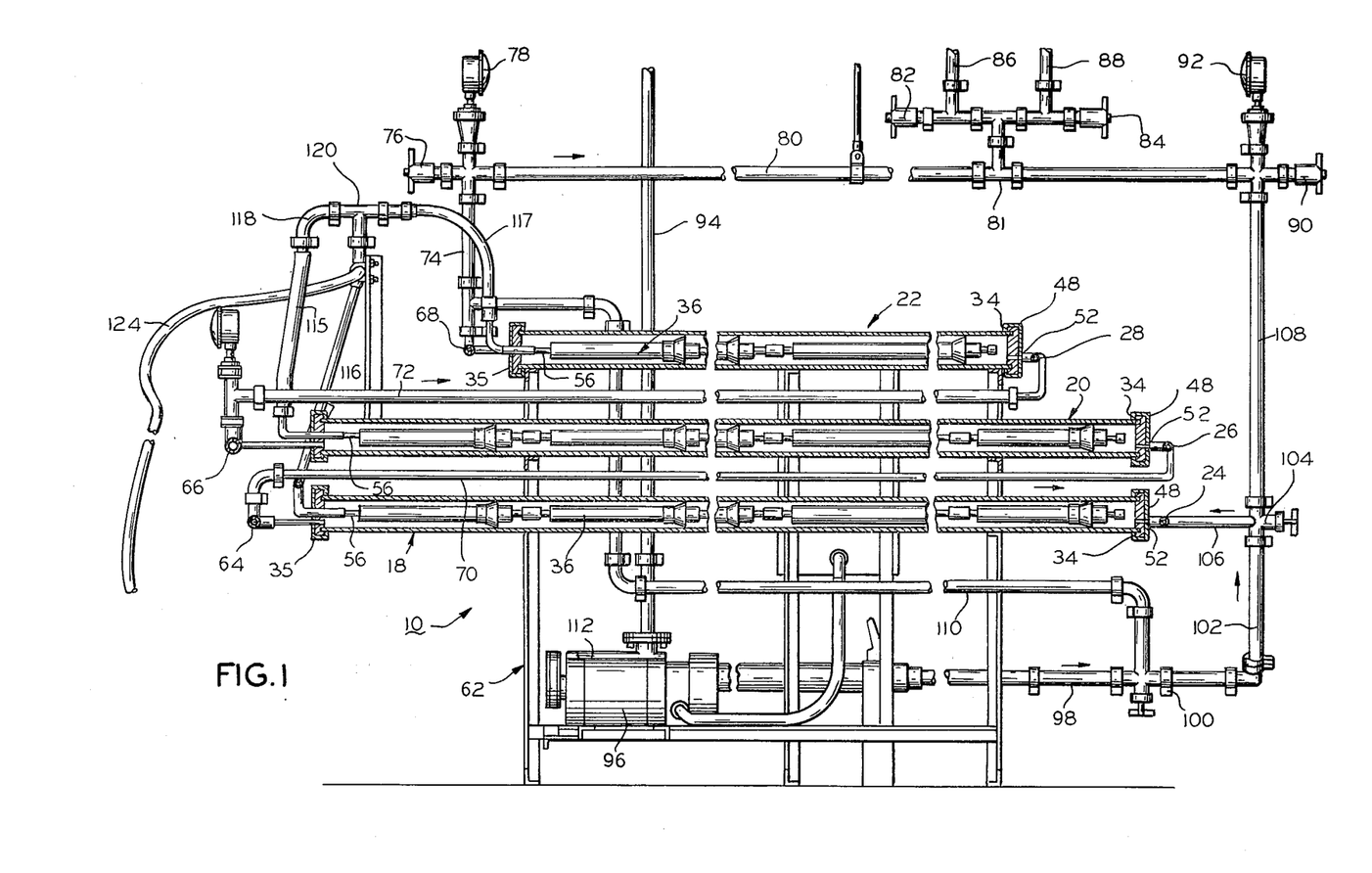
FIG. 1 is a sectional view showing a cheese whey separation apparatus useful with the process of the present invention.
Figure 2:
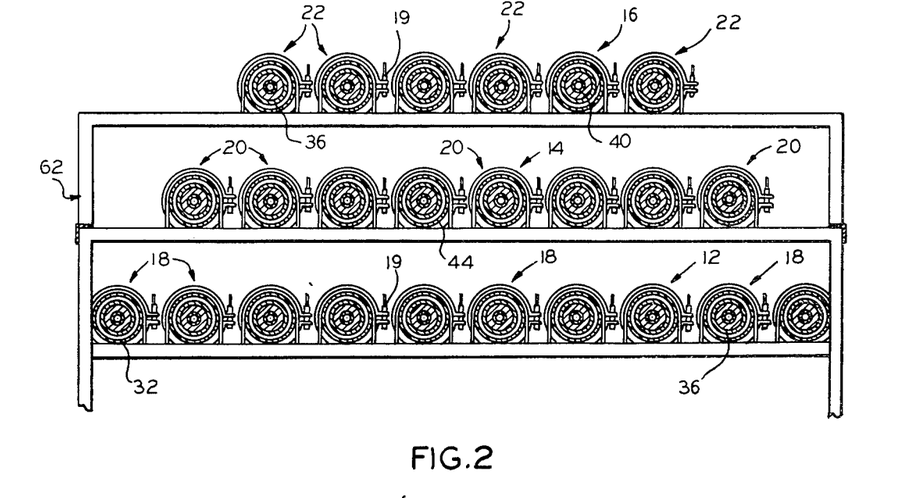
FIG. 2 is a fragmentary, cross-sectional view of the apparatus shown in FIG. 1.

FIGS. 1 and 2 of the drawings show an ultrafiltration unit 10 constructed from a plurality of horizontal banks 12, 14 and 16 of individual filter tubes 18, 20 and 22. The filters are connected to and arranged with input manifolds 24, 26 and 28 on banks 12, 14 and 16, respectively, for introducing whey or whey permeates under pressure into filter tubes 18, 20 and 22.

Figure 3:
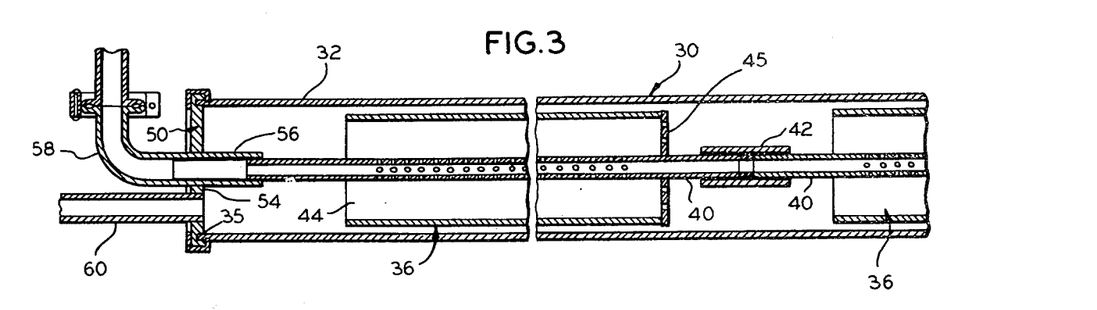
FIG. 3 is a fragmentary, vertical, longitudinal sectional view showing a preferred membrane filter module usefule in the apparatus of FIG. 1.
Figures 4, 5, 6:
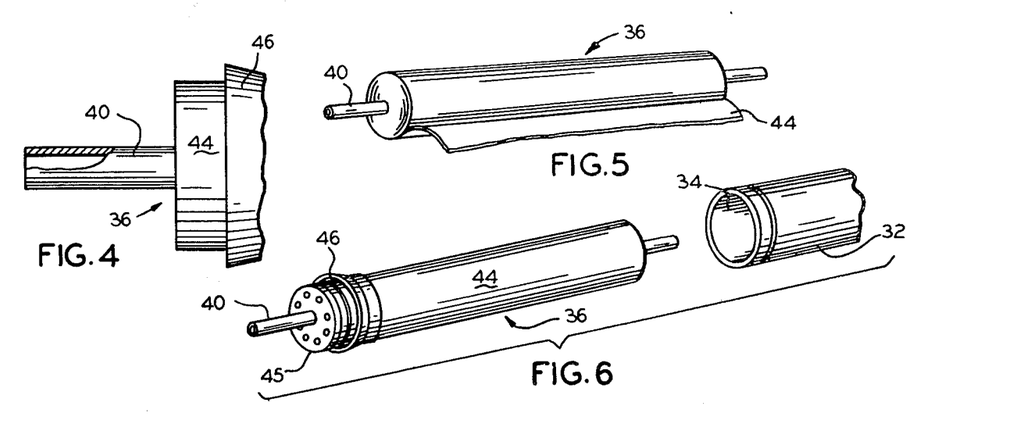
FIG. 4 is a fragmentary, side elevation view, partly cut away and in section, showing an end portion of a membrane filter module as shown in FIG. 4.
FIG. 5 is a perspective view showing a spirally-wound membrane module as shown in FIGS. 4–5.
FIG. 6 is an exploded, perspective view showing a spirally-wound membrane module and associated pressure vessel of a filter according to the present invention.

The individual filter tubes are best shown in FIG. 3 of the drawings where filters 18, 20 and 22 each include a cylindrical pressure vessel 30 having a tubular wall 32 and open ends 34 and 35 (FIG. 1). A plurality of spirally-wound membrane modules 36 are arranged serially in each pressure vessel 30. Modules 36 are connected to one another through a perforated tube 40 forming the core of each individual module. This core, as will be more fully described hereinafter, serves as the permeate collector in the ultrafiltration process. Adjacent ends of modules 36 are connected by a rubber lined connecting sleeve, shown generally at 42, details of which can be found in copending application Ser. No. 483,628, filed June 27, 1974, and entitled "Interconnectors for Food Processing Equipment", which application is expressly incorporated herein by reference. A resilient member (not shown) is provided between adjacent ends of tubes 40 to absorb hydraulic shock as is more fully discussed in said copending application. A membrane 44 (FIG. 5) is spirally-wound around perforated tube 40 so as to form, in effect, a flat envelope open at one end to aid in the transfer of the solution passing through the membrane to the permeate collection tube 40. Membrane 44 is preferably constructed of cellulose acetate, however, other materials providing the desired selectivity between a particular whey solid constituent and the remaining constituents of cheese whey may also be used. Membrane 44 may have a backing constructed in a known manner from a synthetic or glass fabric material (e.g. dacron) capable of withstanding the high pressure encountered inside pressure vessels 30. Seals 46 (FIG. 6) surround the outer perimeter of the spirally-wound membrane 44 and serve to prevent the passage of solution around the modules along walls 32 of pressure vessels 30. As will be more fully discussed hereinafter, specially constructed end caps are provided for pressure vessels 30. Vessels 30 are preferably constructed entirely of 3-A USDA approved dairy stainless steel. All metallic components of the system to be described below are preferably constructed of such stainless steel, which construction is preferred and/or required by both Federal and State regulatory agencies for apparatus to be used in producing human foods. The type of membrane modules 36, except for the means interconnecting them, are generally described in the paper entitled, "Reclamation and Re-Use of Waste Products From Food Processing By Membrane Processes," by D. Dean Spatz, presented to the American Institute of Chemical Engineers on May 24, 1972.

It should be made clear at the outset that the number of banks of pressure vessels shown in the figures is illustrative rather than limiting and as will be explained below, the number of vessels is preferably varied for different steps of the process. Any number of vessels may be employed depending on the desired purity of the final product and the desired output from the system. In addition, the number of serially arranged modules 36 in each of pressure vessels 30 may be varied. For example, individual modules may be 26¼ inches long or 39 inches long and be specially designed for the present invention so that they have an outside diameter of 3.83 inches thereby fitting into pressure vessels 30 snugly. Each end of the module may include a plastic support wheel 45 with a plurality of, for example, ⅛ inch holes through which product can flow. Preferably however, an antitelescoping device such as described in the aforementioned copending application Ser. No. 483,628 is used. These are designed to facilitate cleaning of the apparatus as are the rubber-lined stainless steel sleeve interconnectors 42. The support wheels or other antitelescoping devices may also be turned to an outside diameter of 3.83 inches to fit inside, for example, 4-inch stainless dairy tubing forming the cylindrical walls 32 of pressure vessels 30. Perforated tubes 40 may extend approximately 2 inches beyond the support wheels 45 or other antitelescoping devices. Six 26¼ inch modules as described above may be connected together inside pressure vessel 30 giving a total length of approximately 157 inches. Also by way of example only, FIG. 2 shows that there are 10 filters 18 in bank 12, 8 filters 20 in bank 14 and 6 filters 22 in bank 16. This arrangement is preferred as the desired flow pressures are most easily maintained in apparatus having this pyramid-type arrangement. However, each bank of modules 30 could include the same number of filters.

At each end of pressure vessel 30, a CIP cap is held to pressure vessel 30 with a suitable known CIP dairy clamp and is drilled for the stainless steel fittings to be described hereinafter. At the input end, end cap 48 is provided with fitting 52 constructed of 1-inch stainless piping and arranged so that it enters pressure vessel 30 at the lower portion thereof. At the other end, end cap 50 is provided with two fittings to allow passing permeate to a collecting means and to allow further product flow to the next bank of membrane modules. Fittings 52 of end cap 48 are connected to its respective manifold 24, 26 or 28. End cap 50, on the other hand, covers end 35 which is spaced apart from manifolds 24, 26 and 28 and has an opening 54 arranged adjacent the cylindrical wall 32 and a connector 56 spaced from opening 54 and connected to a tube 40 of the adjacent module 36 connecting sleeve 42 in a manner similar to that described for connecting adjacent modules. An elbow 58 is connected to connector 56 while a length of tubing 60 is arranged in opening 54 to facilitate connection of a hose to opening 54. Openings 54 of end caps 50 are attached to outlet manifold 64, 66 or 68 so that concentrate may be collected for transfer to the next series of filter banks. A pipe 70 carries concentrate from outlet manifold 64 of the first bank of filters to inlet manifold 26 of the next bank. A pipe 72 performs a similar function between outlet manifold 66 and the inlet manifold 28 of the uppermost bank of filters. A pipe 74 extends from outlet manifold 68 of said uppermost bank of filters to dairy valve 76 and pressure gauge 78. A pipe 80 is in turn connected to valve 76 and is anchored at the end of unit 10 spaced from valve 76 by valve 90 which is also attached to another pressure gauge 92.

Filter banks 12, 14 and 16, together with the various manifolds, transfer pipes and fittings, are mounted together on a support frame 62 of suitable construction and may be retained on frame 62 by brackets 19 which can be best seen in FIG. 2. Arranged along pipe 80 somewhere along its length is a T-fitting 81 leading to a pair of long stemmed micrometer valves 82 and 84 connected respectively to pipes 86 and 88. A flow path is then established from pipe 80 into either pipes 86, 88 or continuing along pipe 80, depending on the degree micrometer valves 82 and 84 are opened.

A pump 96 is also shown in FIG. 1 for pumping the feed material through the banks of membranes, and pump 96 may actually be one or more positive displacement of centrifugal pumps which feeds the material to be concentrated under pressure through a pipe 98 to a conventional dairy valve 100. Another pipe 102 connects valve 100 to another conventional valve 104 which is connected to a pipe 106 extending to the first inlet manifold 24. Another pipe 108 is connected between valve 90 at one end of pipe 80 and valve 104 while a still further pipe 110 extends from valve 100 to pipe 74 (connecting the final output manifold 68 to valve 76). A motor 112 which may be of conventional design is mounted on frame 62 to selectively actuate pump 96. The piping system just described allows filter unit 10 to be employed for passing filtrate through the membranes in either direction, thereby allowing a cleaning in place of the modules. This CIP feature prolongs the lifetime of the spirally-wound membrane modules by allowing periodic cleaning thereof.

At the left-hand side of FIG. 1, a system is provided for collecting the permeate forced into perforated tubes 40 through the spirally-wound modules. The connectors 56 have already been described as having elbows 58 connected thereto. Transparent sleeves 115 and 116 may be connected respectively to the elbows 58 of the middle and lower individual membrane tubes and are connected at their remote end by elbows 118 to a series of T-fittings 120 at the top or upper portion of unit 10. An additional opening of T-fitting 120 is connected to a similar transparent sleeve 117 connected to elbow 58 of the uppermost bank of pressure vessels. The final opening of the T-fitting 120 is connected to a tubular manifold 122 which serves to collect permeate from all locations of the pressure vessels and passes the collected product out a hose 124 connected to one end of manifold 122. The number of transparent sleeves, T's and elbow fittings is illustrative only as any method may be employed for collecting the permeate leaving each individual tubular pressure vessel 30. Of course the transparent sleeves may be eliminated so that the connectors would be attached directly to their respective manifolds. As just described, then, the permeate is collected through the series of elbows and collecting means at the left-hand side of the Figure, while the concentrate which is not allowed to enter permeate tubes 40 passes progressively through each bank of membrane modules, through pipes 74 and 80 to the vicinity of the micrometer valves and the pressure gauges hereinbefore described. The function of the clean in place operation and the operation of micrometer valves for determining the solid content of the concentrate will next be described.

In the foregoing description of separating unit 10, reference was made to four valves 76, 90, 104 and 100, each of which was described as being a conventional dairy compression valve. The valves are located, in the preferred embodiment, so as to provide the capability for passing concentrate through the various rows of filter banks in opposite directions to clean the filters and comply with dairy control laws, and the valves may be automated so that the cleaning function is accomplished periodically at set intervals. A brief summary of the positioning of the valves will be helpful in understanding the CIP capability. Valve 100 is located near the output pipe 98 from pump 96. Valve 100 is connected to a T-fitting, the other two portions of the T being connected respectively to pipe 74 connecting outlet manifold 68 and valve 76 and to pipe 102 connecting valves 100 and 104. Valve 76 in turn connects pipe 74 to pipe 80 which extends longitudinally across the top of unit 10. At the remote end of pipe 80 is a valve 90, and pipe 108 connects valve 90 to valve 104 whose final outlet is connected to inlet manifold 24. If valve 100 is adjusted to close pipe 110, the input whey or whey fraction will flow into pipe 102 through valve 104 into inlet manifold 24 and through the banks of membranes as hereinbefore described. The concentrate resulting from the filtration process would then pass through valve 76 and pipe 80 to the vicinity of micrometer valves 82 and 84. On the other hand, pipe 102 connecting valves 100 and 104 can be closed to product flow wherein the feed material would pass through pipe 110 to pipe 74, and if valve 76 is also closed, product flow is reversed so that concentrate would leave the lower bank of membranes through pipe 106 and travel through open valves 104 and 90 to the vicinity of micrometer valves 82 and 84.

Unit 10 according to the present invention may be used as a continuous concentrating device by adjusting micrometer valve 82 to the desired pressure and having the concentrate issue from that valve to a separate receptacle (not shown) behind pump 96. Only enough fresh material to be concentrated is added to compensate for the permeate removed. When the desired solids level has been reached, the other micrometer valve 84 is opened to remove product of the desired concentration. A higher concentration rate may be obtained by routing the flow through micrometer valve 82 back to a holding tank (not shown), thereby allowing a full flow of fresh input material over the membranes 44 and maintaining the lowest possible level of solids over membranes 44 for the longest possible time, and having a batch all reach the desired level at one time. This batch may then be concentrated by a similar rerouting process. This latter method, however, is less desirable than the aforementioned method especially for the protein concentration since the product tends to acquire and acid flavor making it less desirable as a food substitute, although its use as a feed product for animals is not impaired. Micrometer valves 82 and 84 have been found to be preferred as opposed to other types of valves which could employed. The long, tapered needles of the micrometer valves allow a large surface over which concentrate passes and reduces shearing of individual molecules, a feature which is of special importance in the protein recovery operation.

Figure 7:
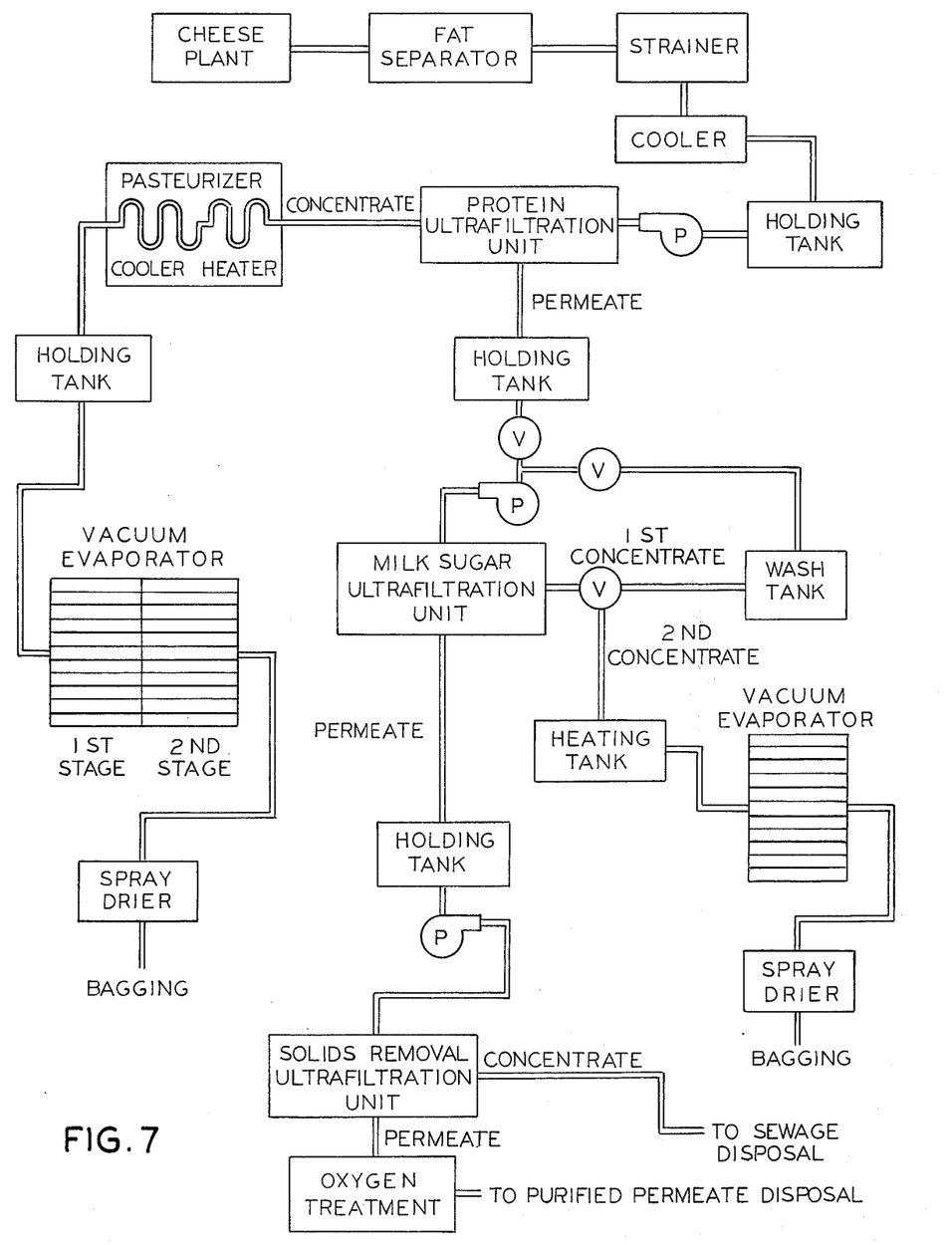
FIG. 7 is a schematic flow diagram of the cheese whey nutrient separation and permeate purification process according to the present invention.

Referring now to FIG. 7 of the drawings, cheese whey is drawn off the cheese vats which customarily run at a temperature approximating 103° F. The whey is then passed through a fat separator to remove as much butterfat as possible, the separator preferably being of the conventional centrifugal variety. The whey is then passed through a mesh having approximately 25 micron openings to screen out gelatinated particles which would clog the filters if not removed. The next step in the process comprises passing the whey across a cooling plate where the whey is cooled to a temperature of under 90° to avoid clogging of membranes 44 during subsequent ultrafiltration. It has been found that if the filtration temperature exceeds about 90° the membranes will rapidly clog during extended runs, even if the CIP feature is utilized. It has also been found that the machine itself heats the whey approximately 6° (pump heat), and accordingly, it is necessary that the product be chilled to at least 84° before being introduced into the membrane banks. Sixty-eight degrees has been found to be a preferred temperature to avoid approaching the 90° figure as whey is pumped through the filter banks. It is also possible to use temperatures well below 68°, successful runs having been made at temperatures approaching the freezing temperature of whey. However, the separation is slower as the temperature of the input whey is reduced even though finely flavored products are produced at the lower temperatures.

Pump 96 injects the cooled whey into the input manifold 24 of fractionator 10 at a rate of approximately eighteen gallons per pressure vessel at a pressure of up to 200 pounds per square inch. In the Figures, only a single pump is shown for purposes of illustration, but in the preferred embodiment, a pair of centrifugal pumps are employed for the protein separation step. Depending on the particular material selected for the membranes, the number of membrane filter banks employed and the particular type of cheese whey being separated, the pressure and volume parameters can be adjusted to maximize output of the system. Membranes 44 used in step one of the process are selective to molecular weights exceeding between 1,000 and 5,000. Micrometer valve 84 is closed at the start of the process, micrometer valve 82 is adjusted to the desired back pressure, (preferably 40 psi in this step) and the concentrate leaves the system through pipe 86 and passes back to the inlet of pump 96. The only fluid leaving the system is the permeate or sugar water which is being discharged through pipe 124. After a predetermined time, on the order of approximately five minutes, when sufficient concentration of protein has been obtained, micrometer valve 84 is cracked and the solid content of the product checked by suitable analytic means, e.g., by the use of a refractometer. It has been determined that when the refractometer indicates a 11% solids content in the product leaving pipe 88 a final product will be obtained upon drying which includes 36% protein on a dry matter basis. Preferably 13% of the gross volume is removed as concentrates in this step.

By suitable adjustment of micrometer valve 84, a constant flow of product having a known solids content can be obtained. For quality control, it is advantageous to recheck the solids content at periodic intervals to insure that the machine is operating without increasing or decreasing the solid levels of the protein concentrate. It is also preferable to continually check the product flow at each bank of filters, i.e. by checking the permeate removal manifolds.

At this point in the process the whey has been divided into two fractions. Approximately 13% of the volume is whey concentrate and the remaining is the sugar-salt portion. The description will now be directed to the further processing of the whey concentrate although it should be understood that all products of the entire system can be produced sequentially and processed simultaneously. The solid stream having a concentration of approximately 11% solids is next transported to a balance tank and collected for holding prior to pasteurization. Pasteurization is accomplished by heating the concentrate to above about 162° but below about 165° F for a period of approximately 20–28 seconds, 23 seconds at 164° F being preferred. The concentrate is heated by passing it over heated plates at as repid a rate as possible to avoid burn-on on the plates and consequent denaturization of the protein in the concentrate. After the heating step, the concentrate is immediately chilled to well below 90°, for example 36° F, preferably all in a total elapsed time of approximately 30 seconds. The disclosed process is not to be limited to these operating parameters as the time and temperature holding factors may vary slightly depending on the solid percentage of the concentrate. Higher temperatures and shorter holding times will accomplish the aim of bacterial control of the concentrate without substantial denaturization. It has also been noted that protein concentrates having different solids levels have different heat tolerances and that as the percentage of protein increases a decrease in heat tolerance is encountered. The chilling step can be avoided if the evaporators and spray dryers used in the operation have sufficient capacity to treat protein concentrate at elevated temperatures immediately as it leaves the pasteurizer.

The final step involves drying the concentrate to produce a fine, powdered, milk-flavored product. This step should be accomplished within 72 hours of pasteurization. Careful control is necessary in this step to insure a desirable final flavor of the product and also the powder consistency thereof. It has been determined that a two-chest vacuum evaporator preferably is used to increase the concentration of the protein product to between 44% and 47% solids, following which the final product is spray dried to a powdered form. Through repeated experimentation, it has also been determined that a high vacuum, low heat method of evaporation produces optimum final results. The first effect of the vacuum evaporator is preferably run at approximately 26 inches of vacuum and the second effect at approximately 29 inches of vacuum. An initial effect evaporator temperature of approximately 132° F is preferred although the evaporators can be run at other temperatures, for example, between 130° and 165° F. Some problems may be encountered if the temperature of the first chest of the evaporation exceeds 152°. Evaporators are known to the art which include a series of pumps which can take the concentrate from the cooling storage chest, heat it at various stages to 130° or more and inject it into the first effect tube chest through a compression valve that restricts the flow into the evaporator. The heat is given up quickly as the concentrate is introduced into the vacuum atmosphere and evaporation occurs. Preferred evaporators are those which include a vapor heater between the first and second effects.

The concentrate leaving the final stage of the evaporator should contain at least 40% solids, 42 to 47% being preferred, and is injected into a spray dryer to produce the final product. A low heat, high vacuum method prevents denaturization and balling of the product. In addition, a sweet milk-flavored product is produced using the high vacuum, low temperature method. A quality product, but with slightly less favorable taste characteristics is produced if a lower vacuum is used. In addition, using the high vacuum and low heat method, the solubility index of the final product is higher. Cone or box type spray driers may be employed. Step one of the preferred embodiment produces a powdered product having a solubility index of 0.05–0.15 which, as is well known, is several times greater than the most stringent requirements for extra grade milk. In addition, the final product has a PER higher than the finest available cow's milk, a fine bulk density, a pH of 5.8 to 6.3, and an ash content of 75–80% of milk (6–7%). The product from the spray drier has a protein content of 34–36%. In terms of nutritional value of the dry protein product, the product of this invention exceeds skim milk by 18%.

As an additive-fortifier for cheese the product has special characteristics, after cheese is salted and drained, the protein powder is added at 3% of gross cheese weight just like salt in at least two applications with agitator running. Product will turn to liquid almost instantaneously must have dwell time to absorb before being put into forms or barrels-absorbancy of product results in holding fat and moisture of drippings so that resultant product is approximately same analysis as original. Cheese yield is increased by approximately two pounds for each one pound of product added. Body and flavor are vastly improved.

Nearly the same procedure is applicable to meat. Here we add 6% of gross weight of meat plus 6% moisture and 30% fat. Grind and mix well. Put in links or patties. Body is greatly strengthened and flavor enhanced. Requires some hours to absorb. Patties or links have almost no shrinkage when cooked as protein locks fat and moisture in.

Dealing next with step two of the process, the permeate from step one typically contains approximately 83% carbohydrate, approximately 3.4% protein, approximately 10.4% minerals, a small quantity of vitamins, the balance being chiefly lactose. The solid content of the permeate is typically on the order of 5% which translates to 48,266 parts per million of dissolved solids having a biological oxygen demand (BOD) of 15,000 mg/l and a chemical oxygen demand (COD) of 49,507 mg/l.

This permeate is collected in a balance tank between the protein fractioner of FIG. 1 and the inlet pump system of the milk sugar separator. This device is similar in many respects to the fractionator of FIG. 1 except that preferably more filter tubes are employed and the pump 96 for this device compresses three 20 hp centrifugal pumps. In addition, the modules 36 include a different membrane material 44, i.e. one that is selective to the passage or lactose of milk sugar. These membranes are selective to substances having molecular weights exceeding 300-500.

The primary operating parameters of step two are pressure and flow, accordingly the need for greater injection pump capacity. Here, the injection pressure is on the order of 360 psi and the micrometer valves are adjusted for a back pressure of 300 psi in the manner as the back pressure was adjusted in step one. Product concentrate in this step is allowed to circulate until the solid content reaches 12–15%, at which point the micrometer valves are adjusted so that the machine is producing 12–15% concentrate on a continuous basis.

This concentrate flow, which represents approximately 30% of the whey permeate volume, is directed to a large holding tank where it is mixed with an approximately equal portion of fresh water and is kept under gentle agitation therein. When the tank is substantially full, the material from the holding tank is refractionated in the sugar fractionator, except that this time the solid level is adjusted to approximately 20% as opposed to the 12-15% level in the first run of step two.

The drying of this concentrate is accomplished by heating the final concentrate of step two to at least 150° F and holding the concentrate at this elevated temperature for a period of five hours or so. The concentrate is then heated above 200° F and evaporated to increase the solids content to 40-50%. The product is then dried in a spray drier.

For maximizing the sweetner and solubility characteristics of the dry powder, it is preferred to cool the product between evaporation and spray drying, especially if a box-type spray drier is employed. The cooling is preferably to about 100° F, a temperature which allows the formation of very fine alpha lactose crystals. Crystallization however, should not exceed 20% as a predominance of the beta form of lactose in the final drying step leads to the most desirable product with greater solubility and a higher sweetener index.

The powder produced by step two of the process typically contains on the order of 92% milk sugar, 6% selected minerals and the balance vitamins and smaller molecular weight proteins. It is white in color, has desirable sweetness when compared to lactose, solubility of from 0.10 to 1.20, fine browning characteristics, outstanding biological purity and considerable food energy.

Steps one and two of the process have resulted in the removal of between 1–1.6 pounds of solids for each 100 pounds of whey introduced in step one and have reduced BOD and COD by about one-third. The BOD in step two has been reduced to 3,300 mg/l and the COD to 9,600 mg/l.

The permeate from step two is processed in step three, although it should again be mentioned that the various processing steps can be conducted simultaneously. The starting permeate for step three contains approximately 0.8% solids. The main constituents are carbohydrates (approximately 60%) ash (approximately 40%), and protein materials (less than 1/100 of 1%). The permeate is again directed to a holding tank and is then pumped through yet another fractionation machine similar to FIG. 1. This time however, the input pressure is on the order of 400 psi and the back pressure is adjusted to approximately 380 psi. The membranes 44 for this operation have still greater selectivity than those used for the lactose separation, i.e. selectivity of materials having molecular weights exceeding about 50. The concentrate in this step is removed when the solid level reaches 2%, resulting in a concentrate equal to approximately 10% of the volume of the step three input permeate. The concentrate may be disposed of by using a ridge end furrow system or can be transported and spread as field fertilizer. If the volumes of such concentrate are too great to handle, step three can be repeated, as each run reduces the volume by approximately 90% with corresponding reductions of solids, BOD and COD.

After a single step three operation, the permeate remaining contains approximately 1,700 ppm solids and has a BOD of approximately 300 mg/l and a COD of approximately 900 mg/l. The primary purpose of step four, the final step, is the reduction of the BOD of this permeate to a level which permits discharge directly into rivers or streams. I have found that by adding oxygen to the permeate, the BOD will be reduced. This may be accomplised in a variety of ways. The preferred method oxygen addition is to mix hydrogen peroxide (a diluted 30% solution is satisfactory) with the permeate. The amount of oxygen which must be added can be calculated by analytically determining the protein nitrogen content of the step three permeate. From this determination the stoichiometric equivalent of oxygen can be calculated. It is best to employ a substantial excess of oxygen to insure maximum BOD reduction, so in the preferred embodiment I use a ten fold excess of oxygen. Such a treatment will reduce the BOD to less than 10 and the COD will be reduced by a factor of about ⅓.

Alternately, oxygen or air can be blown through the permeate, but process control is less precise using this procedure. The permeate resulting from step four can be disposed of in rivers and streams without creating significant pollution problems.

In addition to the highly desirable aim of reducing pollutant effects of whey disposal, the present invention provides an energy efficient process for recovering nutrients from whey. The fractionators remove water from concentrates at an energy cost of roughly 1/10 the corresponding cost for oil or electric powered evaporators. Moreover, the profit in recovering valuable food products from whey using the process of the present invention should act as an incentive to rapidly cure a potentially disastrous problem for the cheese industry.

Numerous variations of the present process are within the scope of the invention. For example, if an evaporator and dryer are not available at the fractionating plant, the concentrates may be transported for drying. If this is desired for protein drying, certain precautions must be observed. The material must be cooled to around 40° or less and air must be excluded from the mixture. Particularly if the pH of the product is under 6.0, the product will gel unless these precautions are observed, and the product will not only be hard to handle but will yield a low bulk density powder when dried. Further, some installations may produce larger quantities of whey than can be handled by the fractionating equipment. This whey may be transported to a suitable separating apparatus. In this case, it is only necessary that the raw whey be cooled sufficiently to inhibit bacterial growth and avoid freezing of the mixture. Bacterial growth is inhibited substantially below about 50° F.

So while the foregoing invention has been described in connection with a particular preferred embodiment thereof, the invention is not to be limited by that description but is to be limited solely by the claims which follow.

I claim

1. A method of separating lactose constituents from whey comprising the steps of:
   removing substantially all proteins from the whey,
   separating and concentrating the milk sugar constituents from the remaining whey constituents by the process of ultrafiltration using membranes substantially impermeable to whey sugar but permeable to the water, salt and ash constituents of whey,
   washing the whey sugar concentrate, reconcentrating said whey sugar concentrate, and drying the twice concentrated whey sugar concentrate.

2. The method set forth in 1 wherein said second concentration step is to a higher solid level than said first concentration step.

3. The method set forth in claim 2 wherein said initial concentration step is to a solids level of between about 12–15% and wherein said reconcentration step is to a solids level of about 20%.

4. The method set forth in claim 1 wherein said drying step comprises the individual steps of:
   heating the final concentrate above about 150° F, and holding said temperature for in excess of one hour,
   evaporating said concentrate to a solids level of between about 40–50% at a temperature in excess of 200° F, and
   spray drying the partially evaporated concentrate 5. The method set forth in claim 4 wherein said whey is cooled to about 100° F between said evaporation and cooling steps to produce a controlled concentration of alpha-lactose crystals.

6. A method for separating the constituents of whey by ultrafiltration wherein whey is concentrated by passing it through a plurality of serially arranged, spirally wound ultrafiltration modules, the improvements in said method comprising:
   a. removing substantially all protein constituents from whey by said ultrafiltration process employing protein impermeable but whey sugar, salt, water and ash permeable membranes,
   b. introducing the permeate from said whey removal step into different ones of said ultrafiltration modules containing membranes impermeable to whey sugar but permeable to the salt, ash and water constituents of whey, c. recirculating said permeate through said different ultrafiltration modules until the solids level thereof is between about 12–15%, d. mixing the resultant concentrated whey sugar with water to wash the sugar concentrate, e. reconcentrating said water and concentrated whey sugar mixture by the process of step c until the solids level reaches about 20%, f. heating said reconcentrated whey sugar to above 150° F, g. evaporating said concentrated whey sugar to a solids level of about 40–50% and, h. spray drying said partially evaporated whey sugar.

7. The method of claim 6 wherein the combined permeates from steps c and e are introduced into still different ones of said ultrafiltration modules containing membranes impermeable to substantially all dissolved solid constituents of whey, and concentrating said combined permeates to a solids level of about 2%.

8. The method set forth in claim 7 wherein the inlet pressure for the concentration steps for proteins, whey sugar, and solids are increased as the molecular weight permeability of the membranes employed are decreased.

9. The method of claim 8 wherein the protein concentration is run at an injection pressure of up to about 200 psi, the whey sugar concentration at an injection pressure of about 300 psi and the solids concentration at an injection pressure of about 400 psi.

10. The method of claim 7 wherein the final permeate remaining from said solids concentration is treated with oxygen to reduce the biological oxygen demand thereof.

11. The method of claim 10 wherein said oxygen treatment comprises adding hydrogen peroxide to said final permeate.

12. The method of claim 11 wherein the amount of oxygen necessary for reduction of biological oxygen demand is determined by analytically measuring the protein nitrogen content of said final permeate and adding a molar excess of oxygen to said final permeate.

13. The method of claim 12 wherein said molar excess is approximately 10:1.

14. The method of claim 10 wherein said oxygen treatment comprises bubbling a gas selected from the group consisting of oxygen and air through said final permeate.

15. A method for recovering nutrients from whey and reducing the BOD and COD of the effluents produced in the nutrient recovery processes, said method comprising the steps of:

a. providing three ultrafiltration systems each comprising a plurality of serially arranged spiral-wound ultrafiltration modules and each being adapted for the input, concentration, circulation and recirculation of liquid materials and each being adapted for continuous removal of concentrated product of a desired solids level, said systems consisting of:
  i. a first system in which the modules contain ultrafiltration membranes permeable to substantially all constituents of whey except the proteins,
  ii. a second system in which the modules contain ultrafiltration membranes permeable to the constituents of whey having molecular weights less than the sugar constituents of whey, and
  iii. a third system in which the modules contain ultrafiltration membranes permeable only to those constituents of whey having molecular weights below about 50, b. cooling whey to below about 84° F, c. concentrating the protein constituents of whey in said first system and treating said concentrated proteins by the steps of:
  i. pasteurizing the concentrated protein,
  ii. cooling said pasteurized protein, and iii. drying the protein concentrate, d. concentrating the ultrafiltration permeate from step c in said second system to produce a concentrated whey sugar fraction, washing said concentrated sugar fraction with water, and reconcentrating said washed sugar fraction in said second system and drying said twice concentrated sugar fraction, e. concentrating the permeates from step d in said third system, and f. treating the permeate from step e with oxygen to reduce the BOD and COD thereof.

16. The method set forth in claim 15 including between step a and step c the additional step of removing fat and gelatinized particles from the whey.

17. The method of claim 15 wherein the proteins of whey are concentrated in step c to a solids level of approximately 11% and wherein said pasteurization temperature is approximately 162°–165° F for a period of 15–25 seconds and wherein said drying step includes the sequential steps of evaporating said concentrated protein and spray drying the product produced in the evaporation step.

18. The method of claim 15 wherein the first concentration of step d is continued until the solids level of the concentrated sugar fraction reaches solids level of between about 12–15% and the second concentration of step d is continued until the solids level reaches about 20%, and wherein the drying step of step d comprises heating the twice concentrated sugar fraction above 150° F and then evaporating and spray drying the lactose fraction.

19. The method of claim 15 wherein the oxygen treatment of step f comprises adding hydrogen peroxide to the permeate from step e.

20. The method of claim 15 wherein:
  the proteins of whey are concentrated in step c to a solids level of approximately 11% and wherein said pasteurization temperature equals approximately 162°–165° F for a period of 15–25 seconds and wherein said drying steps includes the sequential steps of evaporating said concentrated protein and spray drying the residue from the evaporation step,
  the first concentration of step *d* is continued until the solids level of the concentrated sugar fraction reaches a solids level of between about 12–15% and the second concentration of step d is continued until the solids level reaches about 20%, and wherein the drying step of step d comprises heating the twice concentrated sugar fraction above 150° F and then evaporating and spray drying the lactose fraction, and
  the oxygen treatment of step f comprises adding hydrogen peroxide to the permeate from step e.

21. The method of claim 20 wherein the ultrafiltration processes of steps c, d and e are conducted at increasingly higher pressures as the molecular weight permeabilities of the membranes in said three systems decrease from said first to said third system.

* * * * *